United States Patent
O'Toole et al.

(10) Patent No.: US 11,068,897 B2
(45) Date of Patent: Jul. 20, 2021

(54) COMPLETING RISK ANALYSIS USING PUSH COMMUNICATIONS

(71) Applicant: PayPal, Inc., San Jose, CA (US)

(72) Inventors: Christopher Diebold O'Toole, Cedar Park, TX (US); Bryant Genepang Luk, Round Rock, TX (US); Jason Ziaja, Cedar Park, TX (US); Shaun Warman, Cedar Park, TX (US); Ananya Das, Austin, TX (US)

(73) Assignee: PayPal, Inc., San Jose, CA (US)

( * ) Notice: Subject to any disclaimer, the term of this patent is extended or adjusted under 35 U.S.C. 154(b) by 664 days.

(21) Appl. No.: 15/850,509

(22) Filed: Dec. 21, 2017

(65) Prior Publication Data

US 2019/0197546 A1 Jun. 27, 2019

(51) Int. Cl.
*G06Q 40/00* (2012.01)
*G06Q 20/40* (2012.01)
*G06Q 20/10* (2012.01)
*H04W 4/02* (2018.01)
*G06Q 30/06* (2012.01)
*H04L 29/08* (2006.01)
*G06Q 20/32* (2012.01)

(52) U.S. Cl.
CPC ......... *G06Q 20/4016* (2013.01); *G06Q 20/10* (2013.01); *G06Q 20/3278* (2013.01); *G06Q 30/06* (2013.01); *H04L 67/26* (2013.01); *H04W 4/02* (2013.01)

(58) Field of Classification Search
CPC ..................................................... G06Q 40/00
USPC ........................................................ 705/44
See application file for complete search history.

(56) References Cited

U.S. PATENT DOCUMENTS

2015/0195133 A1* 7/2015 Sheets .................... H04W 4/50
709/222

\* cited by examiner

*Primary Examiner* — Ojo O Oyebisi
(74) *Attorney, Agent, or Firm* — Haynes and Boone, LLP

(57) ABSTRACT

A system is configured to perform operations that include receiving first device information corresponding to a consumer device of a _Sonsumer, where the first device information is collected by a merchant application of a merchant in response to a payment transaction request being initiated between the consumer and the merchant. The operations further include determining that the first device information fails to satisfy a risk analysis threshold for performing a risk analysis process and in response, transmitting a push communication to the consumer device. The push communication includes instructions that cause the consumer device to automatically transmit, to the system, second device information corresponding to the consumer device. Additionally, the operations include based on the second device information, executing the risk analysis process with respect to the payment transaction request.

20 Claims, 5 Drawing Sheets

COMPLETING RISK ANALYSIS USING PUSH COMMUNICATIONS

BACKGROUND

In order to process a payment transaction between a payer and a payee, such as between a consumer and a merchant, a payment provider may typically perform a risk assessment with respect to the payer. The payment provider may perform the risk assessment in order to prevent a fraudulent transaction, such as by verifying the identity of the payer, as well as various other risk related analyses. In certain cases, the payment provider may analyze a set of risk criteria information to determine a risk level associated with the payment transaction, which may include device information of a consumer device of the consumer.

Figure 1:
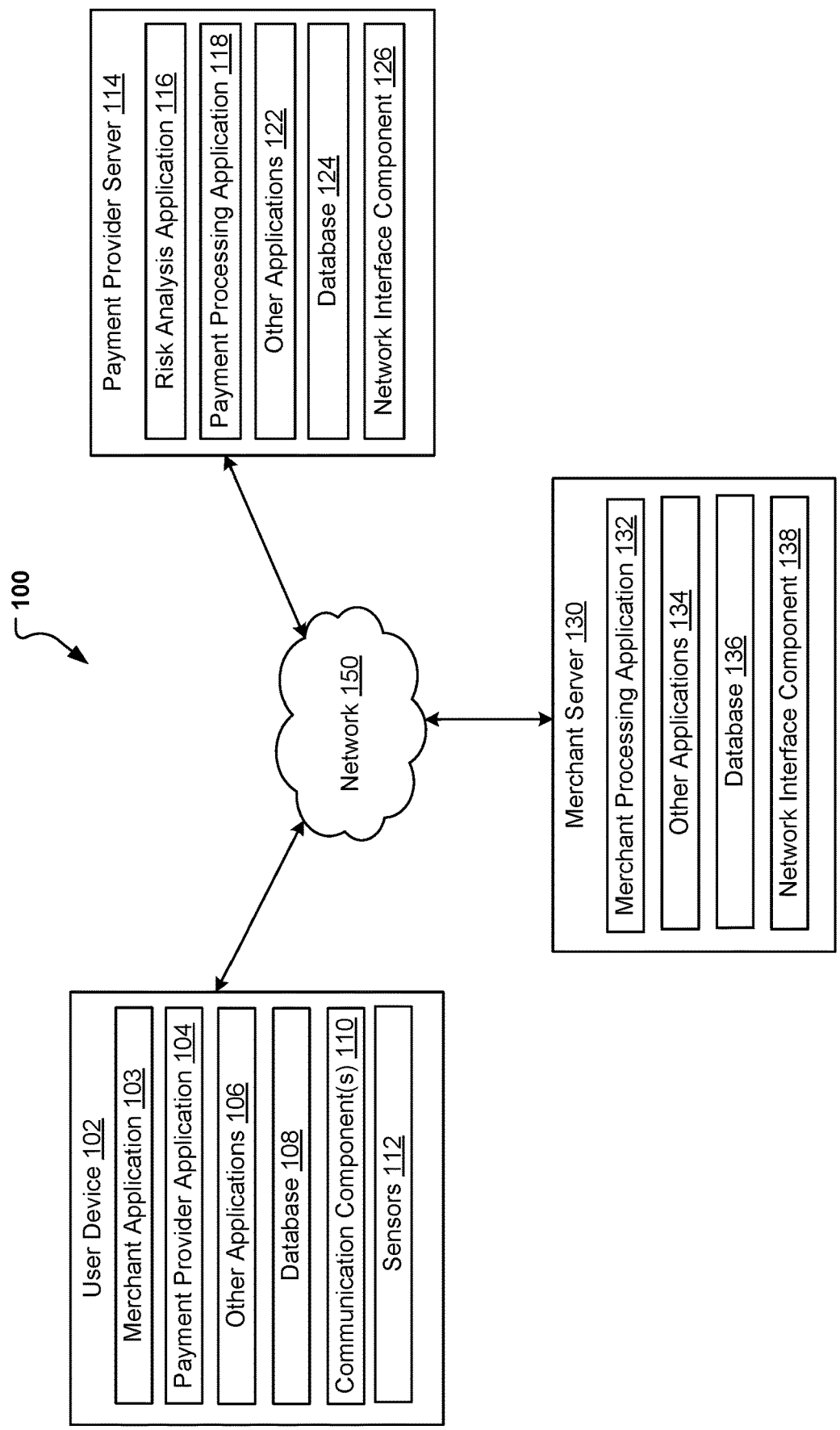
FIG. 1 is a block diagram of a networked system suitable for implementing the processes described herein for completing risk analysis using push communications.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Systems and methods are provided for completing risk analysis using push communications. According to a particular embodiment, a consumer device of a consumer may store a merchant application and a payment application. The merchant application may be associated with a merchant and the payment application may be provided and/or maintained by a payment provider. Further, the consumer may initiate a purchase transaction, via the merchant application, to buy a good service offered by the merchant. The merchant application may provide one or more payment options for the consumer to complete the purchase transaction.

In some implementations, the one or more payment options may include a first payment option that is provided by the payment provider. The consumer may select the first payment option for completing the purchase transaction, and in response to the consumer selection, the merchant application may be configured to obtain first device information associated with the consumer device. For example, the merchant application may interface with an application programming interface (API) provided by the payment provider (e.g., or one or more payment provider servers of the payment provider), which may cause the merchant application to obtain the first device information in response to the first payment option being selected by the consumer to complete the purchase transaction. Subsequent to collecting the first device information, the merchant application may transmit the first device information to a payment provider server of the payment provider.

The payment provider server may be configured to perform a risk analysis process in order to determine a risk level associated with the purchase transaction. Based on the risk level, the payment provider server may determine a likelihood that the purchase transaction is fraudulent. The payment provider server may compare the risk level with a risk threshold, and if the risk level is less than the risk threshold, the payment provider server may authorize the purchase transaction. Otherwise, the payment provider server may determine that the purchase transaction should be declined.

In certain implementations, the risk analysis process may be configured to analyze certain risk information belonging to a set of risk information categories. In some cases, the risk information available to the payment provider server may be incomplete and/or insufficient such that the risk analysis process cannot be performed by the payment provider server. For example, the first device information collected by the merchant application may be missing certain information about the user device or may be corrupted. This could be due to the merchant application improperly interfacing or integrating with the API provided by the payment provider, thereby resulting in the incomplete and/or corrupted device information.

In view of the above, the payment provider server may examine the first device information and determine whether the first device information satisfies a risk analysis threshold. That is, the payment provider server may determine whether the first device information includes information from the appropriate risk information categories (e.g., not corrupted and/or missing information) for performing the risk analysis process. For instance, the payment provider server may compare the first device information with the set of risk information categories to determine whether information from any of the risk information categories is missing from the first device information.

In certain embodiments, the payment provider server may determine that the first device information fails to satisfy the risk analysis threshold. In response to this determination, the payment provider server may transmit a push communication to the consumer device (e.g., the payment provider application stored on the consumer device). The push communication may include instructions that cause the payment provider application to collect second device information from the consumer device. In some cases, the second device information collected by the payment provider application may include information from all the risk information categories in the set of risk information categories. In other cases, the second device information may include only the information from the set of risk information categories that was missing and/or corrupted in the first device information.

Furthermore, the payment provider server may transmit the push communication to the user device without causing the user device to display the push communication. Further, the collection of the second device information may be performed as a background process of the user device and may be conducted without the user's awareness. Thus, the payment provider server may be able to seamlessly obtain information that was initially missing and/or corrupted in the first device information without interrupting the user's experience.

FIG. 1 is a block diagram of a networked system 100 for implementing the processes described herein, according to an embodiment. As shown, system 100 may include or implement a plurality of devices, computers, servers, and/or software components that operate to perform various methodologies in accordance with the described embodiments. Example devices, computers, and servers may include mobile devices, wearable devices, stand-alone devices, desktop computers, laptop computers, and enterprise-class servers, executing an operating system (OS) such as a MICROSOFT® OS, a UNIX® OS, a LINUX® OS, or another suitable device and/or server based OS. It will be appreciated that the devices, computers, and/or servers illustrated in FIG. 1 may be deployed differently and that the operations performed and/or the services provided by such devices, computers, and/or servers may be combined or separated for a given embodiment and may be performed by a greater number or fewer number of devices, computers, and/or servers. Furthermore, one or more of the devices, computers, and/or servers may be operated and/or maintained by the same or different entities.

System 100 includes a user device 102 configured to interface with a user, a payment provider server 114, and a merchant server 130, which may be in communication with each other over a network 150. The user device 102, the payment provider server 114, and the merchant server 130 may each include one or more processors, memories, and other appropriate components for executing computer-executable instructions such as program code and/or data. The computer-executable instructions may be stored on one or more computer readable mediums or computer readable devices to implement the various applications, data, and steps described herein. For example, such instructions may be stored in one or more computer readable media such as memories or data storage devices internal and/or external to various components of system 100, and/or accessible over network 150.

The user device 102 may be implemented as a communication device that may utilize appropriate hardware and software configured for wired and/or wireless communication with the payment provider server 114 and/or the merchant server 130. In certain implementations, the user device 102 may be a mobile phone, tablet, electronic wearable, laptop computer, desktop computer, and/or any other type of computing device usable by user 101. The user device 102 may be configured to accept various forms of payment (such as via the merchant application 103 and/or payment provider application 104), including, but not limited to credit card payments, debit card payments, loyalty card payments, gift card payments, store card payments, and/or payment made by accessing a digital wallet.

The user device 102 may include a merchant application 103, payment provider application 104, other applications 106, a database 108, communication components 110, and sensors 112. The merchant application 103, payment provider application 104, and the other applications 106 may correspond to executable processes, procedures, and/or applications with associated hardware. In other embodiments, the user device 102 may include additional or different components having specialized hardware and/or software to perform operations associated with the merchant application 103, payment provider application 104, and/or the other applications 106.

The merchant application 103 may be provided and maintained by a merchant associated with the merchant server 130. In certain embodiments, the merchant application 103 may provide an interface for the user to purchase items and/or services offered by the merchant. Additionally, the user may be able to access an account that the user maintains with the merchant via the merchant application 103. To this end, the merchant application 103 may communicate with the merchant server 130 in order to facilitate the user's purchase of the items/services offered by the merchant. Further, the merchant application 103 may provide one or more payment methods to the user for such purchases. The payment methods may include, but are not limited to, credit cards, debit cards, gift cards, a payment method provided by the payment provider, coupons, electronic checks, cryptocurrencies, and incentives.

According to one or more embodiments, the user may initiate, via the merchant application 103, a purchase transaction request to buy a particular item from the merchant. Further, the user may select the payment method provided by the payment provider as a means of payment for the purchase transaction. In response, the merchant application 103 may, according to a prior arrangement with the payment provider, collect device information associated with the user device 102 and transmit the device information to the payment provider server 114. For example, in order to facilitate payment transactions that involve using the payment method provided by the payment provider, the merchant application 103 may interface with an API provided by the payment provider. As such, the API may specify that the merchant application 103 is to collect the device information of the user device 102 as part of facilitating such purchase transactions. Additionally, the device information may include, but is not limited to, phone numbers, International Mobile Equipment Identity (IMEI) numbers, location information of the user device 102, manufacturer, brand, model number, screen size, information indicating nearby electronic networks, information indicating nearby devices (e.g., using short-range wireless communication), and/or the like.

The payment provider application 104 may be provided and maintained by the payment provider associated with the payment provider server 114. In certain embodiments, the payment provider application 104 may provide an interface for the user of the user device 102 effect digital payments. As described in further detail below, the payment provider application 104 may be configured to gather additional device information in instances where the device information collected by the merchant application 103 fails to satisfy a risk analysis threshold for performing a risk analysis process with respect to a particular purchase transaction.

The user device 102 may execute the other applications 106 to perform various other tasks and/or operations corresponding to the user device 102. For example, the other applications 106 may include security applications for implementing client-side security features, programmatic client applications for interfacing with appropriate application programming interfaces (APIs) over network 150, or other types of applications. The other applications 106 may also include additional communication applications, such as email, texting, voice, and instant messaging (IM) applications that enable a user to send and receive emails, calls, texts, and other notifications through the network 150. In various embodiments, the other applications 106 may include location detection applications, such as a mapping, compass, and/or global positioning system (GPS) applications, which may be used to determine a location of the user device 102. The other applications 106 may include social networking applications. Additionally, the other applications 106 may include device interfaces and other display modules that may receive input and/or output information. For example, the other applications 106 may include a graphical (GUI) configured to provide an interface to the user.

The user device 102 may further include a database 108, which may be stored in a memory and/or other storage device of the user device 102. The database 108 may include, for example, identifiers (IDs) such as operating system registry entries, cookies associated with the digital wallet application 104 and/or other applications 106, IDs associated with hardware of the communication component 110, IDs used for payment/user/device authentication or identification, and/or other appropriate IDs. The database 108 may also include information corresponding to one or purchase transactions of the user with respect to purchased goods or services from the merchant, browsing histories of the user, or other types of user information. In certain embodiments, the user device 102 may also include information corresponding to payment tokens, such as payment tokens generated by the payment provider server 114. Further, the database 108 may store login credentials, contact information, biometric information, and/or authentication information.

The user device 102 may also include at least one communication component 110 configured to communicate with various other devices such as the merchant server 140 and/or the payment provider server 114. In various embodiments, communication component 110 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth, Bluetooth low-energy, near field communication (NFC) devices, and/ or the like.

The user device 102 may also include one or more hardware sensors 112 to determine user inputs from the user, motion of the user device 102, biometric information associated with the user, and/or various environmental data associated with the user device 102. The sensors 112 may include, but are not limited to, gyroscopes, cameras, microphones, accelerometers, barometers, thermometers, compasses, magnetometers, light detectors, proximity sensors, fingerprint sensors, pedometers, and heart rate monitors.

The payment provider server 114 may be maintained, for example, by the payment provider, which may provide payment processing services for the merchant and/or users of the payment application 106. In one example, the payment provider server 114 may be provided by PAYPAL, Inc. of San Jose, Calif. USA. However, in other embodiments, the payment provider server 114 may be maintained by or include a financial service provider, social networking service, email or messaging service, media sharing service, and/or other service providers which may provide payment processing services.

The payment provider server 114 includes a risk analysis application 116. For a particular purchase transaction, the risk analysis application 116 may be configured to execute a risk analysis process to determine a risk level associated with the particular purchase transaction. The risk level may indicate a likelihood that a particular purchase transaction is fraudulent. For example, the risk analysis application 116 may compare the determined risk level with a risk threshold. If the risk level satisfies the risk threshold (e.g., the risk level is greater than or equal to the risk threshold), the risk analysis application 116 may determine that the particular purchase transaction should be declined. Conversely, if the risk analysis application 116 determines that the risk level is less than the risk threshold, the risk analysis application 116 may determine that the particular purchase transaction can be processed.

The risk level associated with the particular purchase transaction may itself be determined (by the risk analysis application 116 executing the risk analysis process) based on information belonging to a set of risk information categories. For instance, device information collected by the merchant application 103 may belong to one or more categories of the set of risk information categories. As such, the risk analysis application 116 may execute the risk analysis process based on the device information. According to certain embodiments, if information belonging to certain risk information categories of the set of risk information categories are incomplete and/or missing for the particular transaction, the risk analysis application 116 may be unable to execute the risk analysis process.

For example, the device information collected by the merchant application 103 for the particular transaction may be corrupted, missing, and/or otherwise incomplete. For instance, the merchant application 103 may have improperly integrated or interfaced with the API provided by the payment provider. As a result, the device information collected by the merchant application 103 (e.g., collected in response to the initiation of the purchase transaction request) may be corrupted and/or incomplete.

In order to account for the above scenario, prior to executing the risk analysis process to determine the risk level associated with the particular purchase transaction, the risk analysis application 116 may determine whether the collected device information (e.g., provided to the risk analysis application 116 by the merchant application 103) satisfies a risk analysis threshold. For instance, the risk analysis application 116 may examine the collected device information to determine whether the collected device information includes information from the appropriate risk information categories from the set of risk information categories. If the collected device information satisfies the risk analysis threshold, the risk analysis application 116 may proceed to execute the risk analysis process using the device information.

On the other hand, if the collected device information fails to satisfy the risk analysis threshold, the risk analysis application 116 may transmit a push communication to the user device 102. The push communication may cause the payment provider application 104 to collect additional device information so that the risk analysis application 116 may be able perform the risk analysis process. According to some embodiments, the push communication may cause the payment provider application 104 to collect the same device information that the merchant application 103 previously attempted to collect. In other embodiments, the payment provider application 104 may simply collect device information that was corrupted, missing and/or incomplete from the device information that was initially collected by the merchant application 103.

Additionally, the push communication may be generated by the risk analysis application 116 in such a way that transmission of the push communication to the user device 102 does not cause the user device 102 to display the push communication nor any notification corresponding to the push communication. For example, the push communication may include a flag or data element (e.g., a data bit) indicating to the user device 102 and/or an operating system being executed by the user device that the push communication is not to be displayed. Furthermore, the collection of the additional device information by the payment provider application 104 may be performed as a background process of the user device 102.

The additional device information collected by the payment provider application 104 may subsequently be transmitted back to the risk analysis application 116. To this end, the risk analysis process 116 may check whether the additional device information (e.g., or the additional device information in conjunction with the device information collected by the merchant application 103) satisfies the risk analysis process. If so, the risk analysis application 116 may execute the risk analysis process using the additional device information to determine a risk level associated with the particular purchase transaction.

The payment provider server 114 may also include a payment processing application 118. The payment processing application 118 may be configured to process various payments. For example, the payment processing application 118 may process the purchase transaction request, such as in response to the risk analysis application 116 determining that the risk level associated with the purchase transaction request is not greater than the risk threshold. In such a case, the payment processing application may cause payment to be transferred from an account of the user to an account of the merchant.

The payment provider server 114 may execute the other applications 122 to perform various other tasks and/or operations corresponding to the payment provider server and/or the user device 102. For example, the other applications 122 may include security applications for implementing server-side security features, programmatic client applications for interfacing with appropriate application programming interfaces (APIs) over network 150, or other types of applications. The other applications 140 may also include additional communication applications, such as email, texting, voice, and instant messaging (IM) applications that enable a user to send and receive emails, calls, texts, and other notifications through the network 150. In various embodiments, the other applications 140 may include location detection applications, such as a mapping, compass, and/or global positioning system (GPS) applications, which may be used to determine a location of the user device 102. The other applications may 122 include social networking applications. Additionally, the other applications 122 may include device interfaces and other display modules that may receive input and/or output information. For example, the other applications 122 may include a GUI configured to provide an interface to the user.

The payment provider server 114 may further include a database 124, which may be stored in a memory and/or other storage device of the payment provider server 114. The database 124 may include, for example, IDs such as operating system registry entries, cookies associated with the payment processing application 118, biometric information, IDs associated with hardware of the network interface component 126, IDs used for payment/user/device authentication or identification, and/or other appropriate IDs. According to a particular embodiment, the database 124 may also store a merchant identifier associated with the merchant, a location identifier associated with the merchant location, and/or a POS identifier associated with the user device 102.

In various embodiments, the payment provider server 114 also includes at least one network interface component 126 that is configured to communicate with the user device 102 and/or merchant server 130 via the network 150. The network interface component 126 may comprise a DSL modem, a PTSN modem, an Ethernet device, a broadband device, a satellite device and/or various other types of wired and/or wireless network communication devices including microwave, RF, and IR communication devices.

The merchant server 130 may be maintained, for example, by a merchant and may be in communication with the payment provider server 114 and the user device 102. The merchant server 130 includes a merchant processing application 132, which may be executed by the merchant server 130 to interface with the user device 102 (e.g., the merchant application 103) and/or other user devices.

For instance, the merchant processing application 132 may provide access to one or more accounts that the user of the user device 102 maintains with the merchant. The merchant processing application 132 may also process any requests to purchase goods or services offered by the merchant. According to a particular embodiment, the merchant processing application 132 may communicate with the payment provider server 114 to facilitate a purchase transaction, such as in response to the user selecting (e.g., via the merchant application 103) a payment method provided by the payment provider to purchase a particular item from the merchant. Additionally, the merchant processing application 132 may forward or transmit device information of the user device 102 that was collected by the merchant application 103 to the payment provider server 114.

The merchant server 130 may execute the other applications 134 to perform various other tasks and/or operations corresponding to the payment provider server and/or the user device 102. For example, the other applications 134 may include security applications for implementing server-side security features, programmatic client applications for interfacing with appropriate APIs over network 150, or other types of applications. The other applications 134 may also include additional communication applications, such as email, texting, voice, and instant messaging (IM) applications that enable a user to send and receive emails, calls, texts, and other notifications through the network 150. In various embodiments, the other applications 134 may include location detection applications, such as a mapping, compass, and/or global positioning system (GPS) applications, which may be used to determine a location of the user device 102. The other applications may 134 include social networking applications. Additionally, the other applications 134 may include device interfaces and other display modules that may receive input and/or output information. For example, the other applications 134 may include a GUI configured to provide an interface to the user.

The merchant server 130 may further include a database 136, which may be stored in a memory and/or other storage device of the merchant server 130. The database 146 may include, for example, IDs such as operating system registry entries, cookies associated with the payment processing application 118, biometric information, IDs associated with hardware of the network interface component 148, IDs used for payment/user/device authentication or identification, and/or other appropriate IDs. According to a particular embodiment, the database 136 may also store a merchant identifier associated with the merchant, and/or a location identifier associated with the merchant location.

In various embodiments, the merchant server 130 also includes at least one network interface component 138 that is configured to communicate with the user device 102 and/or the payment provider server 114 via the network 150. The network interface component 138 may comprise a DSL modem, a payment provider server, a PTSN modem, an Ethernet device, a broadband device, a satellite device and/or various other types of wired and/or wireless network communication devices including microwave, RF, and IR communication devices.

The network 150 may be implemented as a single network or a combination of multiple networks. For example, in various embodiments, the network 150 may include the Internet or one or more intranets, landline networks, wireless networks, and/or other appropriate types of networks. Thus, the network 150 may correspond to small scale communication networks, such as a private or local area network, or a larger scale network, such as a wide area network or the Internet, accessible by the various components of system 100.

Figure 2:
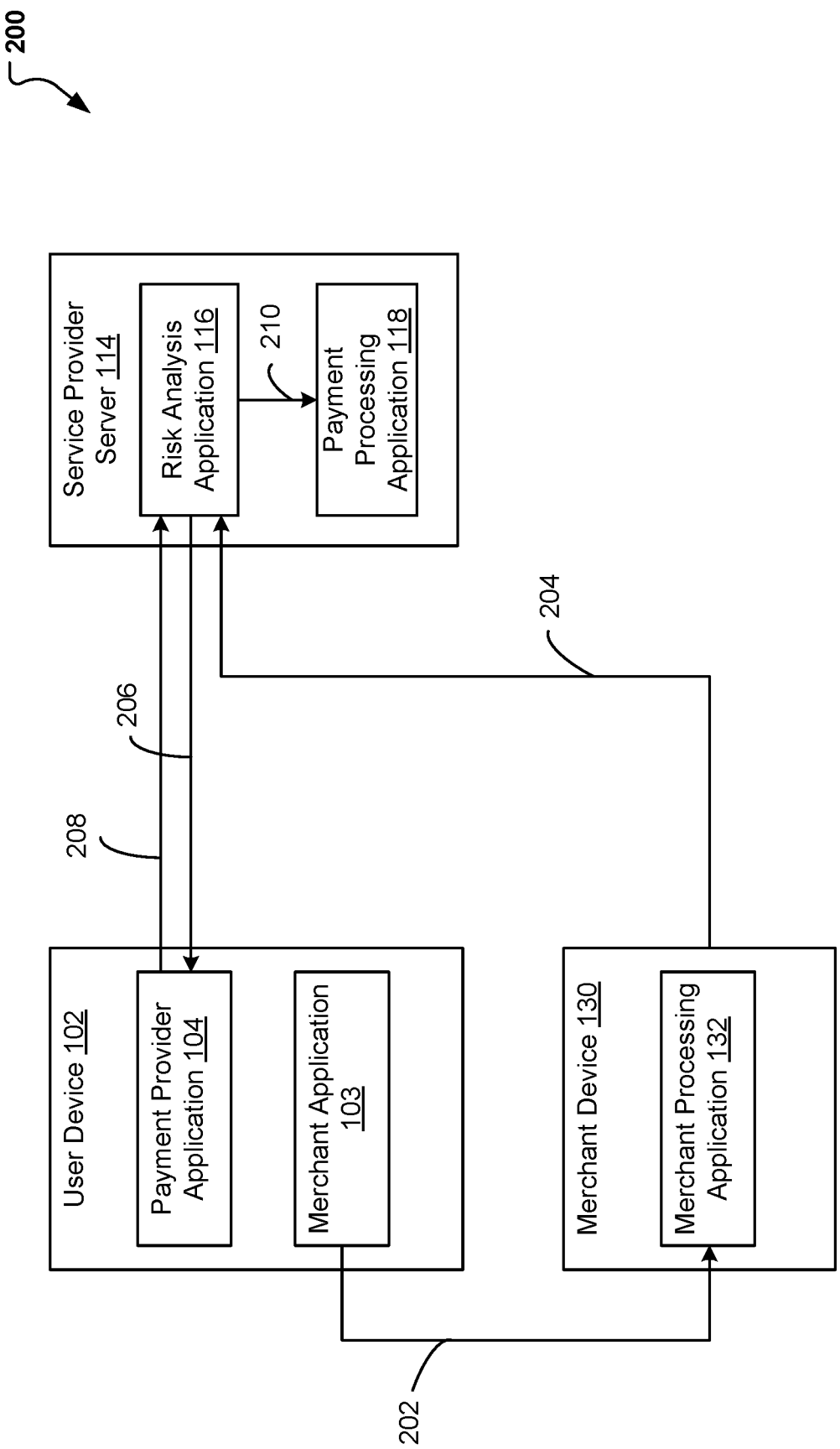
FIG. 2 is an is an example data flow diagram for completing risk analysis using push communications, according to an embodiment.

FIG. 2 illustrates a data flow 200 for completing risk analysis using push communications. At step 202, the merchant application 103 may initiate a purchase transaction request for an item that the user of the user device 102 desires to purchase from the merchant of the merchant device 130. Additionally, the purchase transaction request may indicate the user's selection of a payment method provided by the payment provider to purchase the item. For instance, as previously mentioned, the merchant application 103 may provide the option to use the payment method as one of a plurality of accepted payment methods.

According to certain embodiments, in response to the user's selection of the payment method provided by the payment provider, the merchant application 103 may be configured to collect first device information associated with the user device. For instance, the merchant application 103 may be configured to interface with an API provided by the payment provider when accepting the payment method provided by the payment provider for a purchase. As such, the API may specify that the merchant application 103 is to collect the first device information.

At step 204, the merchant device 103 may forward the purchase transaction request to the payment provider server 114 (e.g., the risk analysis application 116). Additionally, the first device information may also be transmitted to the risk analysis application 116. It will be appreciated that in some implementations, the first device information may be forwarded by the merchant processing application 103 along with the purchase transaction request to the risk analysis application 116. In other implementations, however, the merchant application 103 may transmit the first device information directly to the risk analysis application 116 without being transmitted to the merchant device 130.

The risk analysis application 116 may analyze the first device information and determine whether the first device information satisfies a risk analysis threshold. That is, the risk analysis application 116 may determine whether the first device information is sufficient for executing the risk analysis process. According to a particular embodiment, the risk analysis application 116 may determine that the first device information fails to satisfy the risk analysis threshold. More particularly, as previously discussed, the risk analysis application 116 may determine that the first device information is missing information belonging to one or more categories of a set of risk information categories and/or that some of the first device information has been corrupted. In other words, the first device information may fail to satisfy the risk analysis threshold because it is missing information from one or more of the set of risk information categories and/or because one or more pieces of information from the first device information have been corrupted.

Figure 3:
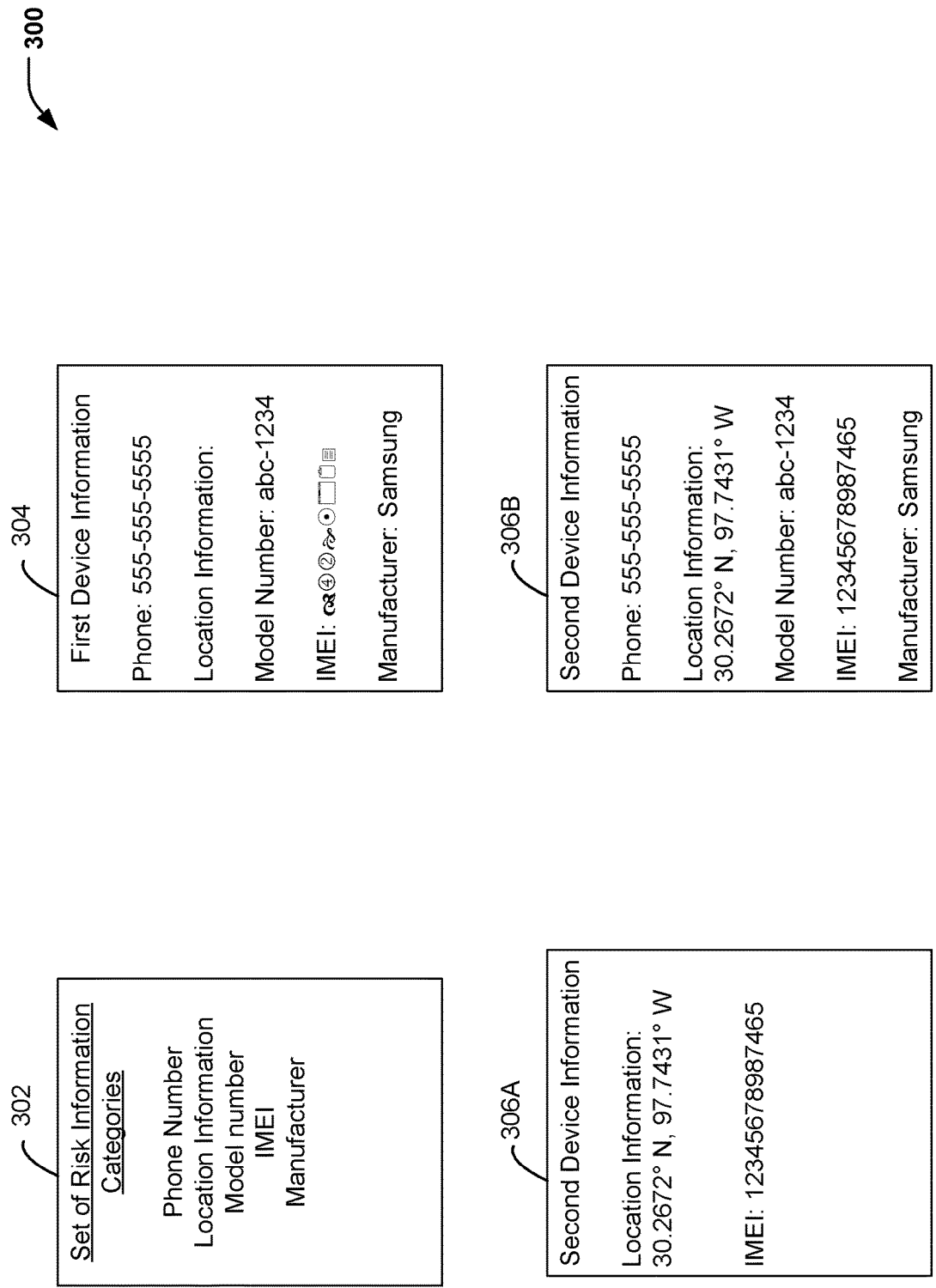
FIG. 3 is an example diagram of risk information categories for completing risk analysis using push communications, according to another embodiment.

For instance, FIG. 3 depicts an example illustration of a set of risk information categories 302 and first device information 304. As shown in FIG. 3, the set of risk information categories 302 includes a phone number category, a location information category, a Model number category, an IMEI category, and a manufacturer category. Additionally, the first device information 304 includes valid information for the phone number category (e.g., 555-555-5555), the model number category (e.g., abc-1234), and the manufacturer category (e.g., Samsung). However, the location information category is missing the corresponding information, and the information for the IMEI has been corrupted. As a result, the risk analysis application 116 may determine that the first device information fails to satisfy the risk analysis threshold. It will be appreciated that the risk information categories illustrated in FIG. 3 are not exhaustive and that other types of risk information categories are also possible.

At step 206, in response to determining that the first device information fails to satisfy the risk analysis threshold, the risk analysis application 116 may transmit a push communication to the payment provider application 104 of the user device 102. The push communication may include instructions that cause the payment provider application 104 to collect second device information corresponding to the user device 102. As previously discussed, in collecting the second device information, the payment provider application 104 may collect the same information that the merchant application 103 attempted to collect with respect to the first device information. In other implementations, the payment provider application 104 may simply attempt to collect the information that was missing and/or corrupted in the first device information.

For example, FIG. 3 depicts second device information 306A that includes only the information that was missing and/or corrupted in the first device information. As such, the second device information includes valid location information (e.g., latitude and longitudinal coordinates, although other types of location information are also possible) as well as the IMEI of the user device 102 (e.g., 12345678987465). As another example, second device information 306B includes information belonging to all of the information categories in the set of risk information categories. Regardless of which implementation is used in collecting the second device information, a complete set of information belonging to the set of risk information categories is obtained.

Furthermore, it will be appreciated that the push communication is transmitted to, and received by, the user device 102 without the user device 102 displaying the push communication. Additionally, the push communication causes the payment provider application 104 to collect the second device information as a background process executed by the user device 102 (or an OS of the user device 102). As a result, according to a particular embodiment, there is no visual indication displayed by the user device 102 of the push communication having been transmitted/received nor a visual indication of the collection of the second device information.

At step 208, the payment provider application 104 may transmit the second device information to the risk analysis application 116. The risk analysis application 116 may also evaluate the second device information against the risk analysis threshold. According to a particular embodiment, the risk analysis application 116 may determine that the second device information satisfies the risk analysis threshold. In response to this determination, the risk analysis application 116 may execute the risk analysis process using the second device information (or a combination of the second device information and the first device information)

to determine a risk level associated with the purchase transaction request. In response to determining that the risk level is lower than a risk threshold, the risk analysis application 116 may transmit the purchase transaction request to the payment processing application 118. At step 210, the payment processing application 118 may process the purchase transaction request and cause payment to be remitted from an account of the user to an account of the merchant.

Furthermore, it will be appreciated that respective push communications may also be transmitted to one or more other devices that are associated with the user of the user device 102. These respective push communications may similarly cause the one or more other devices to collect respective device information and transmit the respective device information back to the payment provider server 114. As such, the respective device information of the one or more other devices may also be used by the risk analysis application 116 to execute the risk analysis process to determine a risk level associated with the purchase transaction request.

Figure 4:
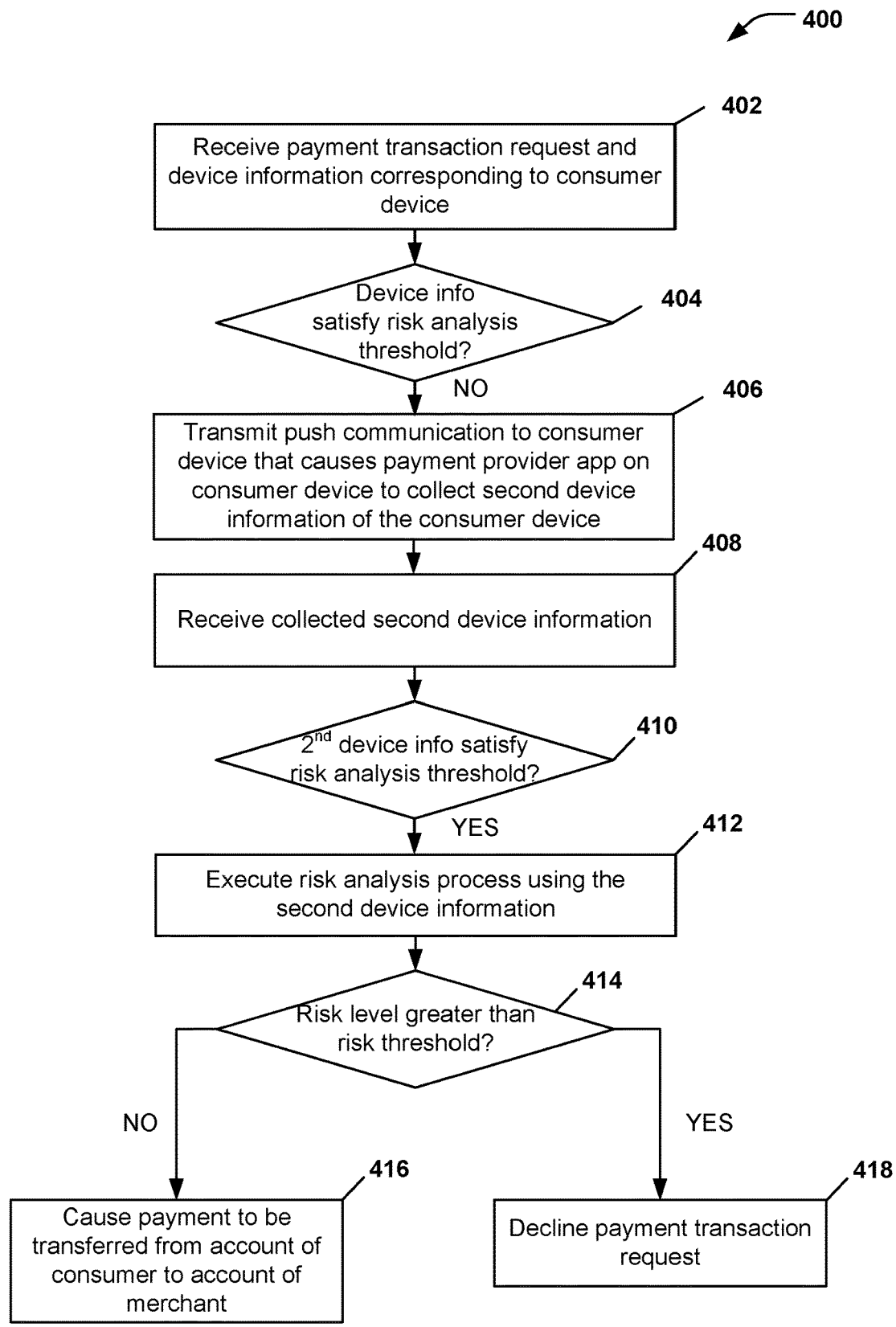
FIG. 4 is an is a flow diagram for completing risk analysis using push communications, according to an embodiment.

FIG. 4 illustrates a flow diagram of a method 400 for completing risk analysis using push communications. Note that one or more steps, processes, and methods described herein may be omitted, performed in a different sequence, or combined as desired or appropriate.

The method 400 may begin in step 402, where a payment provider server, such as payment provider server 114 may receive a payment transaction request and device information corresponding to a consumer device, such as user device 102. The payment transaction request may be a request to pay for item sold by the merchant using a payment method provided by the payment provider. Further, in certain embodiments, the device information may have been collected and transmitted by a merchant application (e.g., merchant application 103) in response the payment method being selected for payment.

At step 404, the payment provider server 114 (e.g., the risk analysis application 116) may determine if the device information satisfies a risk analysis threshold. In particular, as previously discussed, the risk analysis application 116 may determine whether any information belonging to a set of risk information categories is missing from the device information and/or whether any portions of the device information is corrupted.

At step 406, the risk analysis application 116 may transmit a push communication to the user device 102. The push communication causes the payment provider application 104 on the user device 102 to collect second device information associated with the user device 102. The second device information may include the information that was missing and/or corrupted from the device information collected by the merchant application 103. Upon collecting the second device information, the payment provider application 104 may transmit the second device information back to the payment provider server 114.

At step 408, the risk analysis application 116 of the payment provider server 114 may receive the second device information, and at step 410, the risk analysis application 116 may analyze the second device information to determine whether the second device information satisfies the risk analysis threshold. It will be appreciated that in implementations where the second device information includes only the information that was missing and/or corrupted in the device information previously collected by the merchant application 103, the risk analysis application may evaluate a superset of the device information and the second device information against the risk analysis threshold. Thus, in cases where one or more portions of the device information are missing and/or corrupted, and one or more portions of the second device information are also missing and/or corrupted, the risk analysis threshold may nevertheless still be satisfied if a superset of the device information and the second device information include valid information from all categories of the set of risk information categories.

At step 412, in response to determining that the second device information satisfies the risk analysis threshold, the risk analysis application 116 may execute a risk analysis process using the second device information. As previously discussed, the output of the risk analysis process may be a risk level associated with the purchase transaction request. The risk level may indicate a likelihood that the purchase transaction request is fraudulent.

At step 414, the risk analysis application 116 may determine whether the risk level is greater than a risk threshold. If the risk analysis application 116 determines that the risk level is less than or equal to the risk threshold, the method may proceed to step 318 in which the purchase transaction request is processed (e.g., by the payment processing application 118). As a result, payment is transferred from an account of the consumer (e.g., user of the user device 102) to an account of the merchant. On the other hand, if the risk analysis application 116 determines that the risk level is greater than the risk threshold, the risk analysis application may determine that the purchase transaction request should be declined in step 418.

Figure 5:
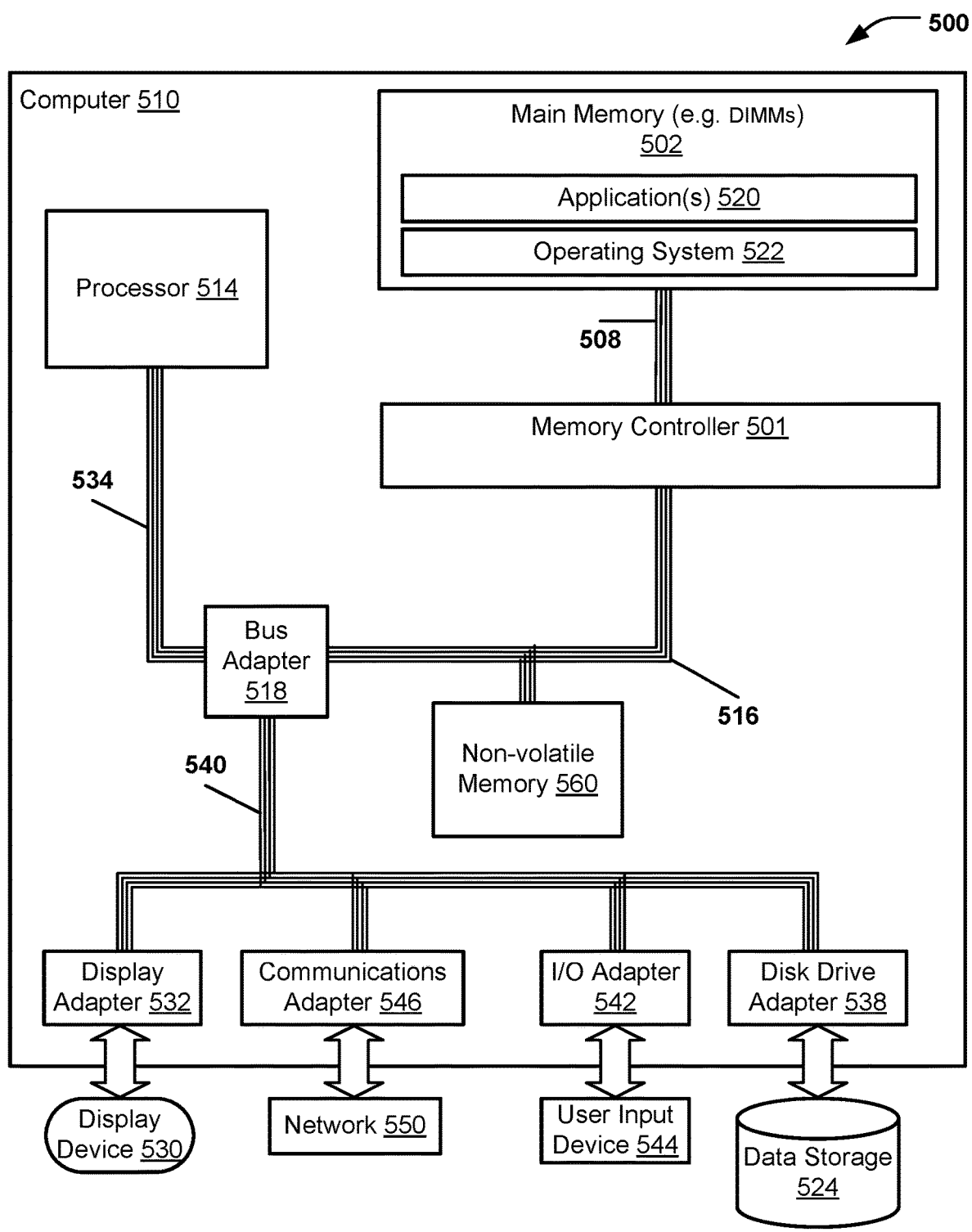
FIG. 5 is a block diagram of a computer system suitable for implementing one or more components in FIG. 1-4, according to an embodiment.

FIG. 5 is a block diagram of a computer system 500 suitable for implementing one or more components in FIG. 1, according to an embodiment. Referring to FIG. 5, an illustrative system 500 including a computer 510 is shown. The computer 510 may be an implementation of a computing system that includes or corresponds to the user device 102, the payment provider server 114, and/or the merchant server 130 of FIG. 1. The computer 510 includes at least one computer processor (CPU) 514 (e.g., a hardware processor) as well as main memory 502, a memory controller 501, and a non-volatile memory 560. The main memory 502 is connected through a memory bus 508 to the memory controller 501. The memory controller 501 and the non-volatile memory 560 are connected through a second memory bus 516 and a bus adapter 518 to the processor 514 through a processor bus 534.

Stored at the memory 502 are one or more applications 520 that may be module(s) or computer program instructions for carrying out particular tasks (e.g., the merchant application 103, the payment provider application 104, risk analysis application 116, and/or payment processing application 118 of FIG. 1). Also stored at the main memory 502 is an operating system 522. Operating systems include, but are not limited to, UNIX® (a registered trademark of The Open Group), Linux® (a registered trademark of Linus Torvalds), Windows® (a registered trademark of Microsoft Corporation, Redmond, Wash., United States), and others as will occur to those of skill in the art. The operating system 522 and the application 520 in the example of FIG. 5 are shown in the main memory 502, but components of the aforementioned software may also, or in addition, be stored at non-volatile memory (e.g., on data storage, such as data storage 524 and/or the non-volatile memory 560).

The computer 510 includes a disk drive adapter 538 coupled through an expansion bus 540 and the bus adapter 518 to the processor 514 and other components of the computer 510. The disk drive adapter 538 connects non-volatile data storage to the computer 510 in the form of the data storage 524 and may be implemented, for example, using Integrated Drive Electronics ("IDE") adapters, Small Computer System Interface ("SCSI") adapters, Serial Attached SCSI ("SAS") adapters, and others as will occur to those of skill in the art. Non-volatile computer memory also may be implemented as an optical disk drive, electrically erasable programmable read-only memory (so-called "EEPROM" or "Flash" memory), RAM drives, and other devices, as will occur to those of skill in the art. In a particular embodiment, the data storage 524 may store the data and information described herein.

The computer 510 also includes one or more input/output ("I/O") adapters 542 that implement user-oriented input/output through, for example, software drivers and computer hardware for controlling input and output to and from user input devices 544, such as keyboards and mice. In addition, the computer 510 includes a communications adapter 546 for data communications with a data communications network 560. The data communications may be carried out serially through Recommended Standard 232 (RS-232) connections (sometimes referred to as "serial" connections), through external buses such as a Universal Serial Bus ("USB"), through data communications networks such as internet protocol (IP) data communications networks, and in other ways as will occur to those of skill in the art. The communications adapter 546 implements the hardware level of data communications through which one computer sends data communications to another computer, directly or through a data communications network. Examples of the communications adapter 546 suitable to use in the computer 510 include, but are not limited to, modems for wired dial-up communications, Ethernet (Institute of Electrical and Electronics Engineers (IEEE) 802.3) adapters for wired network communications, and IEEE 802.11 adapters for wireless network communications. The computer 510 also includes a display adapter 532 that facilitates data communication between the bus adapter 518 and a display device 530, enabling the application 520 to visually present output on the display device 530.

Variations on the ideas previously discussed in the present disclosure are also possible. For example, according to certain embodiments, the payment provider server 114 may receive a purchase transaction request from another device that is different from the user device 102. The other device may be a device that is typically assumed to be within a certain proximity to the user device 102 and/or assumed to be wirelessly connected to the user device 102. For instance, the other device may be a wearable device, such as a smartwatch, or another electronic device, such as a smart television. Further, the purchase transaction request may be a request to purchase an item sold by the merchant using the account that the user (i.e., the user of the user device 102) maintains with the payment provider.

Subsequent to receiving the purchase transaction request, the payment provider server 114 (e.g., via the risk analysis application 116) may transmit a push communication to the user device 102. The push communication may cause the payment provider application 104 to collect first device information associated with the user device 102. Again, the push communication may be transmitted to the user device 102 without causing the user device 102 to display an indication of the push communication. In certain implementations, the first device information may include location information corresponding to the device 102, networks that have been detected by the user device 102, and/or device(s) that may be connected (e.g., wirelessly or wired) to the user device 102.

The payment provider server 114 may also request second device information from the other device that transmitted the purchase transaction request. Alternatively, the second device information may be included in the purchase transaction request itself. The second device information may include location information corresponding to the other device, networks that have been detected by the other device, and/or device(s) that may be connected (e.g., wirelessly or wired) to the other device.

As such, the risk analysis application 116 may compare the first device information with the second device information to determine a risk level corresponding to the purchase transaction request. For example, the risk analysis application may determine, based on respective location information of the user device 102 and the other device, whether the user device 102 is located within a predetermined proximity to the other device. The closer the devices are to each other, the lower the risk level that may be determined by the risk analysis application.

As another example, the risk analysis application 116 may determine whether user device 102 and the other device detect similar networks. The extent to which both devices detect similar networks may be directly proportional to the risk level determined by the risk analysis application. Further, if the risk analysis application 116 determines that the user device 102 and the other device are actually connected to each other, risk analysis application 116 may determine a relatively lower risk level for the purchase transaction request.

Further, the risk analysis application 116 may determine whether the risk level satisfies a second risk threshold (e.g., which may be different from the risk threshold previously described in the present disclosure). If the risk level does not exceed the risk threshold, the risk analysis application 116 may determine that the purchase transaction request should be processed.

In various embodiments of the present disclosure, execution of instruction sequences to practice the present disclosure may be performed by computer system 500. In various other embodiments of the present disclosure, a plurality of computer systems 500 coupled by communications adapter 546 to the network (e.g., such as a LAN, WLAN, and/or various other wired or wireless networks, including telecommunications, mobile, and cellular phone networks) may perform instruction sequences to practice the present disclosure in coordination with one another.

Particular embodiments described herein may take the form of an entirely hardware embodiment, an entirely software embodiment, or an embodiment containing both hardware and software elements. In a particular embodiment, the disclosed methods are implemented in software that is embedded in processor readable storage medium or storage device and executed by a processor that includes but is not limited to firmware, resident software, microcode, etc.

Further, embodiments of the present disclosure, may take the form of a computer program product accessible from a computer-usable or computer-readable storage device providing program code (e.g., computer-executable instructions) for use by or in connection with a computer, processor, or any instruction execution system. For the purposes of this description, a computer-usable or computer-readable storage device may be non-transitory and can be any apparatus that can tangibly embody a computer program and that can contain, store, communicate, propagate, or transport the program for use by or in connection with the instruction execution system, processor, apparatus, or device.

In various embodiments, the medium can include an electronic, magnetic, optical, electromagnetic, infrared, or semiconductor system (or apparatus or device) or a propagation medium. Examples of a computer-readable storage device include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements can include local memory employed during actual execution of the program code, bulk storage, and cache memories that may provide temporary or more permanent storage of at least some program code in order to reduce the number of times code must be retrieved from bulk storage during execution.

Input/output or I/O devices (including but not limited to keyboards, displays, pointing devices, etc.) can be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

What is claimed is:

1. A system, comprising:
   one or more hardware processors; and
   a memory storing computer-executable instructions, that in response to execution by the one or more hardware processors, causes the system to perform operations comprising:
      receiving, by a payment provider, first device information corresponding to a consumer device of a consumer, the first device information being collected by a first mobile application executing on the consumer device in response to a payment transaction request being initiated between the consumer and a merchant;
      detecting that the first device information lacks one or more pieces of information needed to satisfy a risk analysis threshold for performing a risk analysis process;
      determining, based on the detecting, that the first mobile application has not properly integrated or interfaced with an Application Programming Interface (API) provided by the payment provider;
      in response to the determining, transmitting a push communication to a second mobile application of the payment provider, the second mobile application executing on the consumer device as a background process, the push communication including instructions that cause the second mobile application to automatically transmit, to the system, second device information corresponding to the consumer device, wherein the second device information includes the one or more pieces of information missing in the first device information;
      based on the second device information, executing the risk analysis process with respect to the payment transaction request; and
      processing the payment transaction request in response to determining, based on the executing the risk analysis process, that a risk level associated with the payment transaction request satisfies a risk threshold.

2. The system of claim 1, wherein the first device information is a subset of the second device information.

3. The system of claim 1, wherein the detecting that the first device information lacks the one or more pieces of information further comprises:
   determining one or more categories of information included in the first device information; and
   comparing the one or more categories of information with a set of risk information categories that includes the one or more pieces of information;
   wherein detecting that the first device information does not include the one or more pieces of information is based on the comparing.

4. The system of claim 1, wherein the first mobile application comprises a merchant application.

5. The system of claim 1, wherein the push communication comprises a flag or data element indicating to an operating system of the consumer device that the push communication should not be displayed on the consumer device.

6. The system of claim 1, wherein the detecting that the first device information lacks one or more pieces of information comprises detecting that the first device information includes corrupted or unreadable versions of the one or more pieces of information.

7. The system of claim 1, wherein the second device information comprises information selected from the group consisting of location information associated with the consumer device, a phone number, an International Mobile Equipment Identity, manufacturer information, brand information, model information, a network detected by the consumer device, and another device detected by the consumer device.

8. The system of claim 1, wherein the second mobile application comprises a payment provider application.

9. The system of claim 1, wherein the operations further comprise:
   transmitting one or more push communications to one or more additional consumer devices corresponding to the consumer, the one or more push communications causing the one or more additional consumer devices to transmit, to the system, respective device information associated with the one or more additional consumer devices.

10. The system of claim 9, wherein the risk analysis process is executed based on the respective device information.

11. A method, comprising:
   receiving, by a payment provider server of a payment provider, a request to initiate a payment transaction between a merchant and a consumer;

receiving, from a merchant application that runs on a consumer device of the consumer, first device information corresponding to the consumer device;

determining, based on detecting that the first device information lacks one or more pieces of risk criteria information, that the merchant application is not properly communicating with an Application Programming Interface (API) of the payment provider;

in response to the determining identifying a plurality of consumer devices that store respective instances of a payment provider application, the payment provider application being different from the merchant application;

transmitting a respective push communication as a background process to each of the plurality of consumer devices, the respective push communication causing each respective instance of the payment provider application to collect second device information of a corresponding consumer device of the plurality of consumer devices;

receiving the collected second device information and determining that the collected second device information includes the one or more pieces of risk criteria information;

executing a risk analysis process using the collected second device information to determine a risk level associated with the request to initiate the payment transaction; and processing the request based on results of the risk analysis process.

12. The method of claim 11, wherein the detecting that the first device information lacks the one or more pieces of risk criteria information comprises:

detecting that the first device information is missing the one or more pieces of risk criteria information.

13. The method of claim 12, wherein the collected second device information comprises: location information associated with the corresponding consumer device of the plurality of consumer devices, a phone number, an International Mobile Equipment Identity, manufacturer information, brand information, model information, a network detected by the corresponding consumer device of the plurality of consumer devices, or another device detected by the corresponding consumer device of the plurality of consumer devices.

14. The method of claim 11, wherein the detecting that the first device information lacks the one or more pieces of risk criteria information comprises:

detecting that one or more portions of the first device information are unreadable.

15. The method of claim 11, wherein the respective push communication includes a push communication that causes a first instance of the payment provider application to collect first device information of a first consumer device of the plurality of consumer devices without causing the first consumer device to display an indication corresponding to the push communication.

16. The method of claim 15, wherein the push communication is transmitted to the first consumer device via a push notification protocol compatible with an operating system executed by the first consumer device, the push communication including a flag or a data element instructing the operating system not to display the push communication on the consumer device.

17. A non-transitory computer readable medium storing computer-executable instructions that in response to execution by one or more hardware processors, causes a payment provider system to perform operations comprising:

receiving first device information corresponding to a consumer device of a consumer, the first device information being collected by a first mobile application executing on the consumer device in response to a payment transaction request being initiated between the consumer and a merchant;

detecting that the first device information lacks one or more pieces of information needed for performing a risk analysis process;

determining, based on the detecting, that the first mobile application has not properly communicated with an Application Programming Interface (API) of the payment provider system;

in response to the determining, transmitting a push communication as a background process to a second mobile application of the payment provider system, the second mobile application executing on the consumer device, the push communication including instructions that cause the second mobile application to automatically transmit, to the payment provider system, second device information corresponding to the consumer device, wherein the second device information includes the one or more pieces of information missing in the first device information;

based on the second device information, executing the risk analysis process with respect to the payment transaction request; and processing the payment transaction request in response to determining, based on the executing the risk analysis process, that a risk level associated with the payment transaction request satisfies a risk threshold.

18. The non-transitory computer readable medium of claim 17, where in the detecting that the first device information lacks the one or more pieces of information further comprises: detecting that the one or more pieces of information is received but is corrupted or unreadable.

19. The non-transitory computer readable medium of claim 17, wherein the push communication comprises a flag or a data element indicating to an operating system of the consumer device that the push communication should not be displayed on the consumer device.

20. The non-transitory computer readable medium of claim 17, wherein the first mobile application comprises a merchant application, and wherein the second mobile application comprises a payment application of the payment provider system.

* * * * *